United States Patent [19]

Rattunde

[11] Patent Number: 4,500,305
[45] Date of Patent: Feb. 19, 1985

[54] SIDE-BAR CHAIN FOR INFINITELY VARIABLE CONE PULLEY TRANSMISSIONS

[75] Inventor: Manfred Rattunde, Bad Homburg, Fed. Rep. of Germany

[73] Assignee: P.I.V. Antrieb Werner Reimers GmbH & Co. KG, Bad Homburg, Fed. Rep. of Germany

[21] Appl. No.: 402,557

[22] Filed: Jul. 28, 1982

[30] Foreign Application Priority Data

Jul. 28, 1981 [DE] Fed. Rep. of Germany ....... 3129631

[51] Int. Cl.³ .............................................. F16G 1/00
[52] U.S. Cl. .................................. 474/201; 474/242; 474/244
[58] Field of Search ............... 474/201, 242, 244, 245, 474/272, 216, 217

[56] References Cited

U.S. PATENT DOCUMENTS 2,266,688 12/1941 Keller .................................. 474/201

FOREIGN PATENT DOCUMENTS 1264178 3/1968 Fed. Rep. of Germany ...... 474/201

*Primary Examiner*—James A. Leppink
*Assistant Examiner*—Frank H. McKenzie, Jr.
*Attorney, Agent, or Firm*—Spencer & Frank

[57] ABSTRACT

A side-bar chain for an infinitely variable cone pulley transmission which chain includes links composed of individual side bars and rocker pieces inserted through apertures in the side bars and connecting the links together. The rocker pieces have end faces extending laterally of the length of the chain for transmitting friction forces between associated friction pulley sheaves and the side-bar chain. Each of the side bars presents two end webs spaced apart in the running direction of the chain, extending transverse to the running direction and to the length of the rocker pieces, and each bounding a side-bar aperture. At least one of the end webs has a convex rocker surface projecting into the side-bar aperture. The rocker pieces each have a concave rocker surface extending in the longitudinal direction of the rocker pieces and bearing against the convex rocker surface with radius of curvature of the convex rocker surface of the side bar being smaller than that of the concave rocker surface of the rocker piece.

4 Claims, 8 Drawing Figures

SIDE-BAR CHAIN FOR INFINITELY VARIABLE CONE PULLEY TRANSMISSIONS

BACKGROUND OF THE INVENTION

The invention relates to a side-bar chain for infinitely variable cone-pulley transmissions. The chain comprises side bars constituting links as well as rocker pieces constituting pins (joint pieces) which connect individual chain links by extending into apertures of the side bars. The end faces of the rocker pieces transmit the friction forces between the friction pulleys and side-bar chain.

Such side-bar chains are known in many forms. By way of example, reference may be made to German Pat. Nos. 1,065,685, 1,119,065, 1,302,795 and 2,356,289. In those arrangements, the joint pieces are each formed by a pair of rocker pieces which bear on one another through mutually facing rocker surfaces. The joint pieces are shaped such that they connect with the side bars of their respective chain link through a rotational locking arrangement. The rocker pieces bear on the inner contour of the side-bar apertures over their entire surface. It also appears from these printed documents that the chains can be assembled in a double side-bar structure, as disclosed in German Pat. No. 1,065,685, or a triple side-bar structure as disclosed in German Pat. No. 1,119,065 and shown in FIG. 14 thereof, where the double side-bar structure, with greater intervals of the pairs of rocker pieces in the running direction is of narrower construction transversely of the running direction, while the triple side-bar structure, while resulting in greater width transversely of the running direction of the chain, on the other hand, renders possible a reduction in the intervals of the pairs of rocker pieces, that is a reduction of the chain pitch.

This chain pitch is important in several respects. Firstly, the number of articulation pairs of rocker pieces possible per unit of length of the chain and thus the number of their end faces, determines the friction force which can be transmitted between friction pulley sheaves and chain. Next the chain pitch considerably determines the behavior of the chain as regards noise, since the entry of the rocker pieces between the cone pulley sheaves involves an impacttype noise which becomes louder the greater is the chain pitch. Finally, in the case of a coarse chain pitch, the course of the chain in the looping arc between the cone pulley sheaves is substantially polygonal, that is to say has relatively sharp breaks in the force direction, which has an unfavorable effect.

For these reasons the chains of triple side-bar structure would appear preferable. However, these chains are seldom used in practice, since in comparison with chains of equal performance of double side-bar structure they display a width which is half again as great transversely of the running directions. Because of the correspondingly increased chain weight, this leads to increased loading by centrifugal force and moreover, by way of the increased distance between the cone pulleys, has an effect upon the structural size of the entire transmission. The avoidance of these disadvantages predominates by far in comparison with the matters discussed in connection with the chain pitch.

U.S. patent application Ser. No. 285,869 filed July 22nd, 1981, naming Manfred Rattunde and Walter Schapf as inventors and assigned to the assignee of the present application discloses solving the above-mentioned problem by modifying such a side-bar chain so that the chain pitch can be shortened considerably in order to achieve a smoother running of the chain, a higher force transmission capacity and a better polygon formation. For this purpose the rocker pieces of the rocker piece pairs bear against the radial end webs of the side-bar pertaining to their chain link at two abutment regions spaced from one another in the radial direction. The two abutment regions bound a recessed rocker piece surface facing the radial end web of the side-bar. The radial extent of the rocker pieces largely corresponds to the interval of the abutment regions.

Numerous practical cases occur, especially in industrial transmissions set up in working premises, where it is not the strength or power transmission capacity but the noise level alone which is of decisive importance. For example, upper limits for noise intensity are prescribed by the labor supervisory departments. Often the only way to meet prescribed noise standards is by the additional fitting of noise protection hoods, which in turn necessitates additional cooling measures for the transmission.

SUMMARY OF THE INVENTION

It is an object of the invention, starting from sidebar chains of the initially-described kind, to reduce the chain pitch in a significant manner even beyond the amount which was possible with the aforementioned application, with a limited retrogression of the power transmittable by the chain. Thus it is intended to achieve a noise level of the cone pulley transmission utilizing a double side-bar chain which is equal to or less than the noise level of the other noise generators situated in the transmission, such as pump, gear wheels, fans, etc.

In accordance with the invention, the rocker pieces have on at least one of their substantially radially placed sides, in the region of their radial center, a concave rocker surface extending in the longitudinal direction of the rocker pieces, in that the radial end webs of the side bars abutting on these rocker piece sides are in engagement with the concave rocker surface by way of a convex rocker surface. The radius of curvature of the convex rocker surfaces of the radial end webs is smaller than that of the concave rocker surfaces of the rocker pieces.

In accordance with the invention, the articulation pieces can be formed only by one rocker piece, on which the associated radial end webs roll directly over the rocker surfaces, rather than, as in the former case, through the second intermediary rocker piece. This results in a quite considerable shifting of the articulation points towards one another which, in comparison with the initially discussed cases, leads to a reduction of pitch in the range between 33% and 56% depending on the form of construction of the chain. The reduction of the number of rocker pieces also results in a reduction of the frictional contact area between rocker pieces and cone pulleys. However, this can be compensated without great difficulty by rocker pieces correspondingly enlarged in the radial direction. However, with the considerably reduced pitch, there is a larger number of articulation points per unit of length of the chain which serves to compensate somewhat for the reduction in frictional contact area between the rocker pieces and cone pulley sheaves.

In accordance with the invention, the level of the noises caused by the side-bar chain is reduced so greatly that it is equal to or less than the noise generation of the other transmission parts, so that the transmission noise of the side-bar chain no longer dominates as before.

The radial end webs of the side bars are loaded most heavily in the middle. However, in accordance with the invention, a result of the pairing of convex rocker surface of the radial end webs with concave rocker surface of the rocker pieces, the middle of the radial end webs of the side bars has the greatest width. In order still further to increase the load capacity of the radial end webs, they can expediently have radially inwards and outwards on their outside an increase of area. While the weight of the side-bar chain is somewhat increased, the power transmission capacity remains practically the same as known side-bar chains with a quite considerable reduction of the chain pitch.

As regards the concave/convex formation of the respective rocker surface pairing, the invention also has the advantage that the area actually available to take up the pressure per unit area under load is substantially larger than in other side-bar chains as a result of the mating of the abutment faces curved in the same direction. Therefore it is also possible to permit the rocker pieces to rock directly on the radial end webs of the side bars without the occurrence of wear problems.

The rocker pieces can expediently be supported against and abut edge portions bounding the aperture at two abutment regions spaced from one another in the radial direction between which there is a flattened rocker piece surface facing the end webs. The radial dimension of the rocker pieces largely corresponds to the space between the abutment regions. In accordance with the principles set forth in the above-mentioned U.S. patent application Ser. No. 285,869, the correspondingly formed side bars bear with one of their recesses on the rocker pieces through the two-region abutment while the other recess rolls over the rocker surface on the rocker piece.

However, the possibility also exists that the pairing of the rocker pieces with the associated radial end webs of the side bars is the same on both sides of the rocker piece. Thus, the rocker pieces have a concave rocker surface on both sides, so that in relation to their radial central plane they are symmetrical which also applies to the side bars of the chain.

According to a further feature of the invention, a radial central web between the apertures for the rocker pieces is omitted from the side bars. This results in a considerable saving of weight on the chain links which more than compensates for the above-mentioned increase of weight due to the widening of the radial end webs.

There is also a decisive advantage over hitherto-known articulations in that the rocker pieces in the side-bar opening have play in the radial direction inwards and outwards on the side with the convex radial end web. Since the concave/convex rocker surface combination results in a self-centering joint, the rocker joints need no further guidance on their upper and lower sides, so that sliding friction is eliminated. This produces an articulation for high performance chains which results in only pure rocking movement and thus achieves a very high efficiency with minimum friction losses.

DESCRIPTION OF THE PREFERRED EMBODIMENTS

Figure 1:
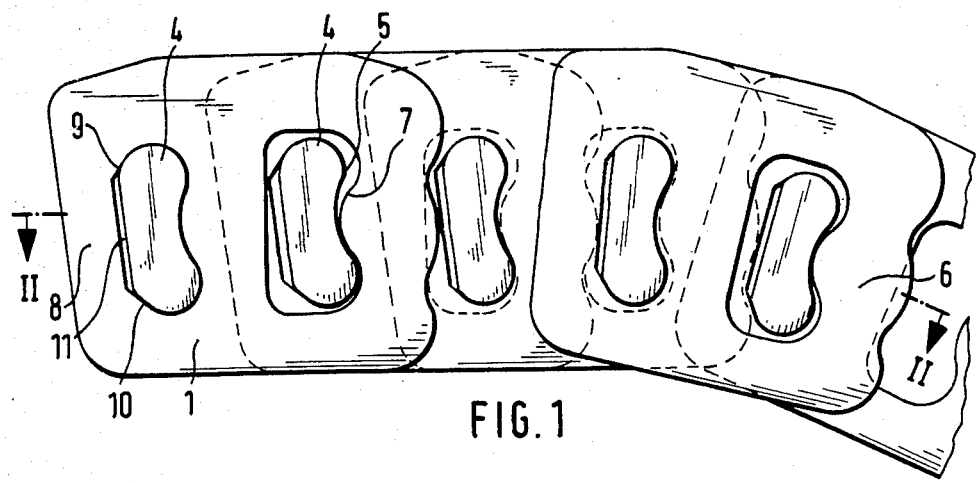
FIG. 1 is a side elevational view of a side-bar chain according to a preferred embodiment of the invention.
Figure 2:
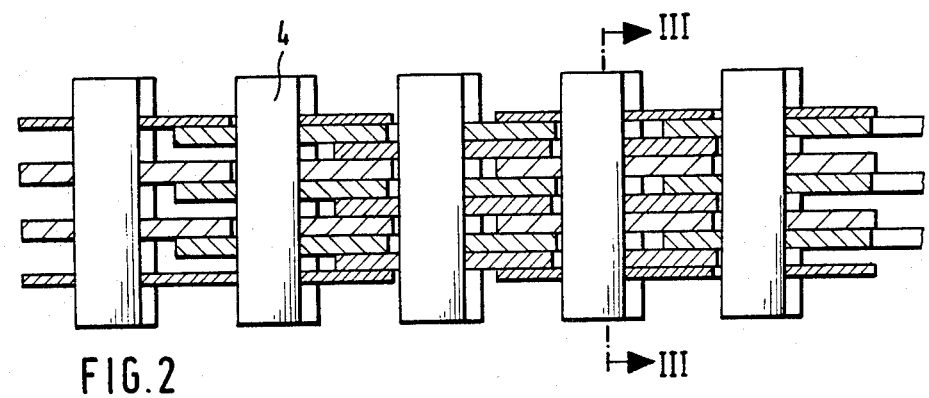
FIG. 2 is a sectional view along the section line II—II in FIG. 1.
Figure 3:
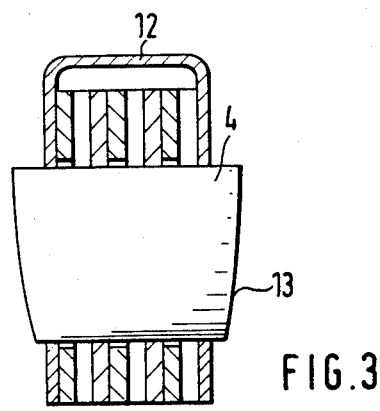
FIG. 3 is a sectional view along the section line III—III in FIG. 2.
Figure 4:
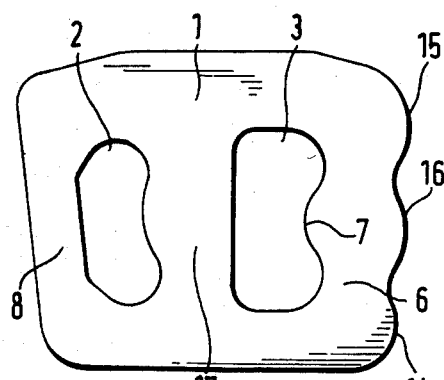
FIG. 4 is a side elevational view of one component of the structure shown in FIG. 1.

FIGS. 1 to 3 show a triple side-bar chain formed of side bars 1 such as individually shown in FIG. 4. The side bars have apertures 2 and 3 into which there are inserted identically structured rocker pieces 4. The apertures 2 and 3 are separated by a middle web 17.

The rocker pieces 4 have on their one substantially radially extending side, in the radial center thereof, a concave rocker surface 5 extending in the longitudinal direction of the rocker pieces. It is noted that a "radial" orientation is intended to mean here a direction which is generally perpendicular to the pivotal axes of the side bars of the chain. Each side bar 1 has a radial end web 6 provided with a convex matching rocker surface 7, the radius of which is smaller than that of the rocker surface 5. The aperture 3 bounded by the radial end web 6 is so dimensioned that the rocker piece 4 can carry out its pivoting movement, that is, a rolling contact between the arcuate surfaces 5 and 7.

The rocker piece 4 is supported against and abuts edge portions bounding the aperture 2 by means of two abutment regions 9 and 10 spaced from one another in the radial direction between which the rocker piece 4 has a flattened face 11 oriented towards the end web 8. The face 11 of the rocker piece 4 is recessed with respect to the adjacent edge of the web 8 and is thus spaced therefrom. The radial dimension of the rocker piece 4 largely corresponds to the spacing between the abutment regions 9 and 10.

As may be seen from FIGS. 1 and 4, the aperture 2 of each side bar 1, which is bounded by the radial end web 8, substantially has the contour of the rocker pieces 4 except for the above-noted space between the face 11 and the web 8.

As may be seen from FIGS. 2 and 3, the side-bar stacks are held together by clamp bars 12 which consist of two outer side bars which are connected by an arch bridging over the side-bar stack. In case the thickness of the clamping bars is one-half of the thickness of the other side bars, there is obtained a chain (FIGS. 1, 2 and 3) which, as concerns the load-carrying cross section, corresponds to a chain having three load-carrying side bars for each link.

FIG. 3 best shows the end faces 13 of the rocker piece 4, which come into frictional contact with the cone pulleys (not shown) of the transmission.

As may further be seen from FIG. 4, the radial end web 6 inwardly and outwardly has widenings 14, 15 and 16 on the outer edge to increase the load capacity of the chain. The widening 16 is located in the middle of the outside edge. The concave constrictions placed between the widenings 14 to 16 are necessary for the free mobility of the next succeeding rocker piece.

Figure 5:
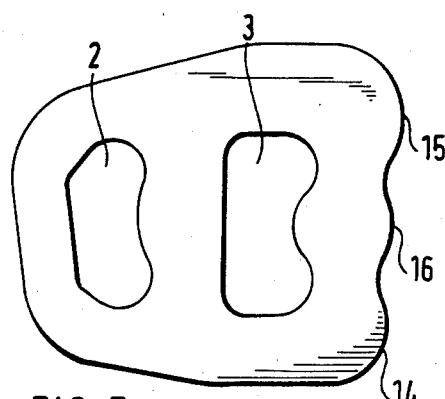
FIGS. 5, 6 and 7 are side elevational views of components of three further preferred embodiments.
Figure 6:
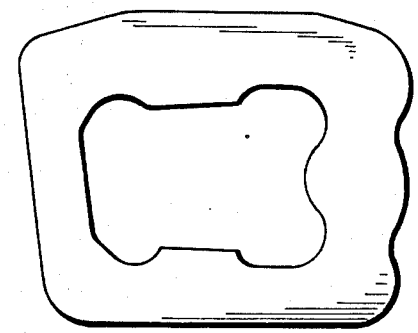

Since the two-region abutment of the rocker pieces 4 results in a lower and more favorable stressing of the side-bar material, the side-bar construction form can be modified as illustrated in FIG. 5. Here the side-bar area is smaller in the region of the aperture 2 than in the region of the aperture 3, which results in a saving of material and thus weight which renders possible a compensation of the additional weight caused by the area widenings 14 to 16. Another embodiment for this purpose is shown in FIG. 6 in which, by comparison with FIG. 4, the middle web 17 is omitted, which likewise constitutes a considerable saving of material and weight. Of course, a combination of the embodiments of FIGS. 5 and 6 is also possible.

Figure 7:
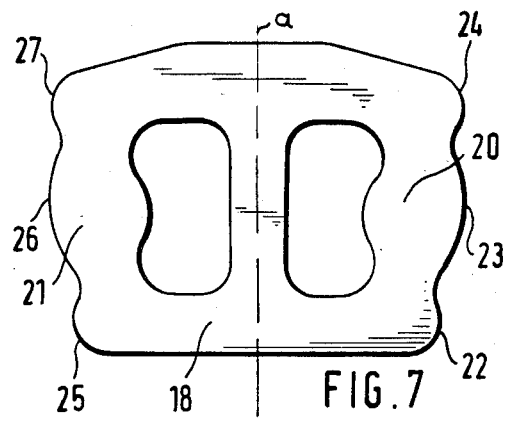
Figure 8:
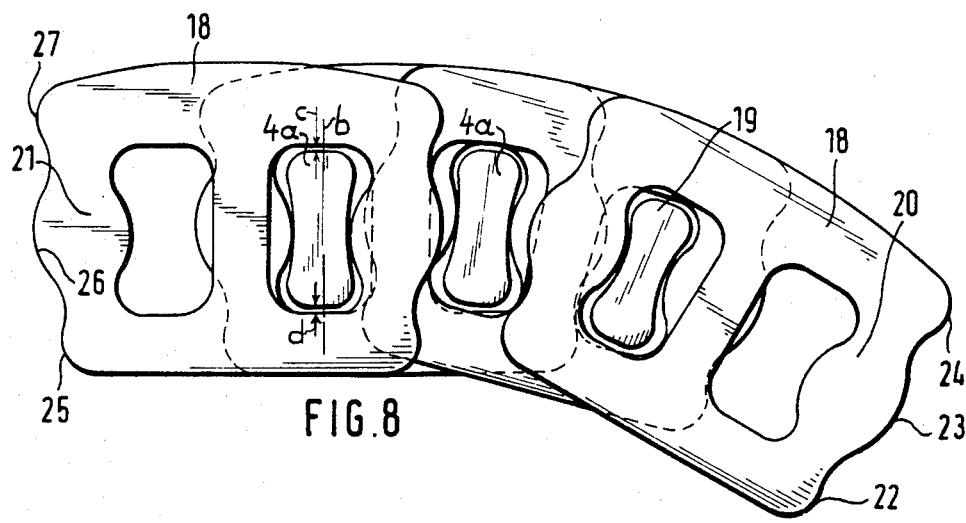
FIG. 8 is a side elevational view of the side-bar chain including the component shown in FIG. 7.

FIGS. 7 and 8 show another embodiment of the side-bar chain according to the invention. The side bar 18 as illustrated in FIG. 7 has a form of construction which is mirror-symmetrical about a radial center line a and represents a double-sided version of the side bar of FIG. 4. Correspondingly, as may be seen from FIG. 8, the rocker pieces 4a are now likewise mirror-symmetrical about a radial center line b so that on both sides the radial end webs 20 and 21 of the side bars 18 are supported by a concave/convex rocker surface pairing. By virtue of such a bilateral rolling engagement between each rocker piece 4a and the side bar edges, the rocker pieces will be self-centering in the side bar apertures and thus no additional guidance of the rocker pieces is needed, for example, along their upper and lower edges 4b and 4c. Rather, between edges 4b and 4c and the respective adjacent side bar edges respective clearances c and d are provided. In the same manner as discussed above in connection with the other embodiments, both the radial end web 20 and the radial end web 21 have area enlargements 22 to 24 on the one hand and 25 to 27 on the other. It is noted that in the tilting of adjacent chain links in relation to one another, the rocker pieces 4a are pivoted through half the tilting angle.

It is further noted that for the sake of clarity, clamp bars 12 shown in FIG. 3 are omitted from FIG. 1 and FIG. 8.

It will be understood that the above description of the present invention is susceptible to various modifications, changes and adaptations and the same are intended to be comprehended within the meaning and range of equivalents of the appended claims.

What is claimed is:

1. In a side-bar chain for an infinitely variable cone pulley transmission; said chain having a running direction and including links composed of individual side bars and single-part rocker pieces inserted through apertures in the side bars and connecting the links together, the rocker pieces having a length transverse to said running direction and end faces extending parallel to said running direction for directly frictionally engaging friction pulley sheaves and for transmitting friction forces between associated friction pulley sheaves and the side-bar chain, the improvement wherein:

each of said side bars has first and second end webs spaced apart parallel to said running direction, said first and second end webs extending transverse to the running direction and to the length of the rocker pieces, said first end web having a first edge and said second web having a second edge; said first and second edges extending generally transversely to the running direction and to the length of the rocker pieces and bounding a side-bar aperture: said side-bar aperture being traversed by a first rocker piece adjoining said first edge and a second rocker piece adjoining said second edge; said first and second edges having a convex rocker surface projecting into the side-bar aperture; the convex rocker surfaces having a first radius of curvature;

each of said first and second rocker pieces have opposite concave rocker surfaces extending parallel to the length of the respective rocker piece; said concave rocker surfces having a second radius of curvature;

said first radius of curvature of each said convex rocker surface is smaller than said second radius of curvature of each said concave rocker surface;

the concave rocker surfaces of each said rocker piece are in rolling engagement with respective adjoining convex rocker surfaces of said first and second webs;

each rocker piece traverses the respective side bar apertures with a clearance in both directions transverse to the running direction and to the length of the rocker piece; and said rocker pieces being normally contacted by the side bars solely with said rolling engagement.

2. A side-bar chain as set forth in claim 1, wherein each said end web has at least one arcuate area enlargement oriented away from said aperture.

3. A side-bar chain as set forth in claim 1, wherein said aperture is a single aperture traversed by said first and second rocker pieces.

4. A side-bar chain as defined in claim 1, wherein each rocker piece traverses each side bar aperture, into which said convex rocker surface projects, with plays in a direction transverse to the running direction and to the length of the rocker piece; said plays being located on opposite sides of said rocker piece.

* * * * *